United States Patent
Wu et al.

(10) Patent No.: US 8,989,471 B2
(45) Date of Patent: Mar. 24, 2015

(54) METHOD AND SYSTEM FOR AUTOMATIC RIB CENTERLINE EXTRACTION USING LEARNING BASED DEFORMABLE TEMPLATE MATCHING

(75) Inventors: Dijia Wu, North Brunswick, NJ (US); David Liu, Tampa, FL (US); Christian Tietjen, Fürth (DE); Grzegorz Soza, Heroldsberg (DE); Shaohua Kevin Zhou, Plainsboro, NJ (US); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 298 days.

(21) Appl. No.: 13/602,730

(22) Filed: Sep. 4, 2012

(65) Prior Publication Data

US 2013/0077841 A1   Mar. 28, 2013

Related U.S. Application Data

(60) Provisional application No. 61/539,561, filed on Sep. 27, 2011.

(51) Int. Cl.
*G06K 9/00*  (2006.01)
*G06K 9/62*  (2006.01)
*G06T 7/00*  (2006.01)

(52) U.S. Cl.
CPC ............ *G06K 9/6207* (2013.01); *G06T 7/0083* (2013.01); *G06T 7/0089* (2013.01); *G06T 2207/10072* (2013.01); *G06T 2207/20081* (2013.01); *G06T 2207/20116* (2013.01); *G06T 2207/30008* (2013.01); *G06T 2207/30172* (2013.01)
USPC ........................................................ 382/131

(58) Field of Classification Search
CPC ............... G06K 9/6207; G06T 2207/30172; G06T 2207/20116; G06T 7/0083; G06T 2207/30008; G06T 7/0089; G06T 2207/10072; G06T 2207/20081
USPC ................................................. 382/128–132
See application file for complete search history.

(56) References Cited

U.S. PATENT DOCUMENTS

| | | | |
|---|---|---|---|
| 7,369,693 | B2 | 5/2008 | Shen |
| 7,764,816 | B2 * | 7/2010 | Shen et al. ..................... 382/128 |
| 8,150,135 | B2 | 4/2012 | Acharyya et al. |
| 8,165,376 | B2 | 4/2012 | Shen et al. |
| 2006/0173271 | A1 | 8/2006 | Shen et al. |
| 2006/0173272 | A1 * | 8/2006 | Qing et al. ..................... 600/407 |
| 2006/0228015 | A1 * | 10/2006 | Brockway et al. ............ 382/132 |

(Continued)

OTHER PUBLICATIONS

Aylward et al., "Initialization, Noise, Singularities, and Scale in Height Ridge Traversal for Tubular Object Centerline Extraction," IEEE TMI, Feb. 2002, pp. 1-27 (61-75).*
Kadoury et al., "Personalized X-Ray 3-D reconstruction of the Scoliotic Spine From Hybrid Statisctical and Image-Based Models," IEEE transactions on medical imaging, vol. 28, No. 9, Sep. 2009, pp. 1422-1435.*

(Continued)

*Primary Examiner* — Shefali Goradia (57) ABSTRACT

A method and system for extracting rib centerlines in a 3D volume, such as a 3D computed tomography (CT) volume, is disclosed. Rib centerline voxels are detected in the 3D volume using a learning based detector. Rib centerlines or the whole rib cage are then extracted by matching a template of rib centerlines for the whole rib cage to the 3D volume based on the detected rib centerline voxels. Each of the extracted rib centerlines are then individually refined using an active contour model.

25 Claims, 6 Drawing Sheets

(56) References Cited

U.S. PATENT DOCUMENTS

2008/0107318 A1    5/2008   Kiraly
2012/0002855 A1*   1/2012   Bai .............................. 382/131
2012/0014506 A1*   1/2012   Lee et al. ....................... 378/41

OTHER PUBLICATIONS

Shen et al., "Tracing Based Segmentation for the Labeling of Individual Rib Structures in Chest CT Volume Data," MICCAI 2004, LNCS 3217, pp. 967-974.*

* cited by examiner

METHOD AND SYSTEM FOR AUTOMATIC RIB CENTERLINE EXTRACTION USING LEARNING BASED DEFORMABLE TEMPLATE MATCHING

This application claims the benefit of U.S. Provisional Application No. 61/539,561, filed Sep. 27, 2011, the disclosure of which is herein incorporated by reference.

BACKGROUND OF THE INVENTION

The present invention relates to rib centerline line extraction in 3D medical image data, such as 3D computed tomography (CT) scans, and more particularly to automatic rib centerline extraction using learning based deformable template matching.

Locating rib metastases and fractures in chest CT scans typically involves reading hundreds of axial CT slices to visually track changes in rib cross-section area. Accordingly, manual reading of CT scans is rather time consuming and rib anomalies are frequently missed in practice due to human error. Automatic extraction of rib anatomical centerlines can be used to enhance the visualization of an unfolded rib cage, which can make routine bone reading tasks more efficient and effective for the radiologists. Extracted and labeled rib centerlines can also serve as a reference to localize organs, register pathologies, and guide correspondence between serial thoracic CT scans for interval change analysis. In addition, the derived information of the rib geometry can assist with the rib cage fracture fixation surgeries.

Figure 1:
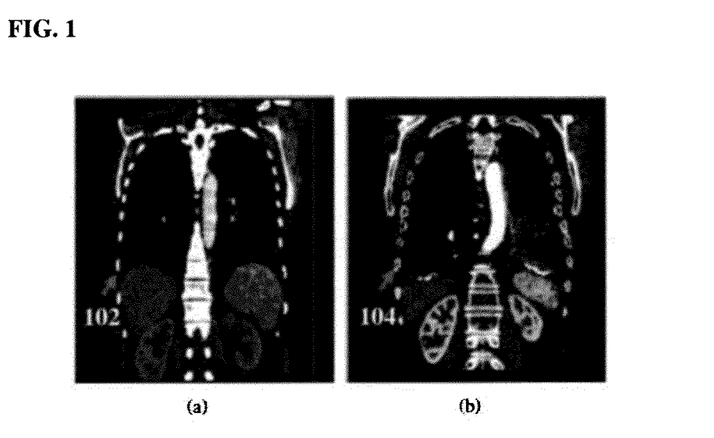
FIG. 1 illustrates examples of different rib cross sections in different patients.
Figure 2:
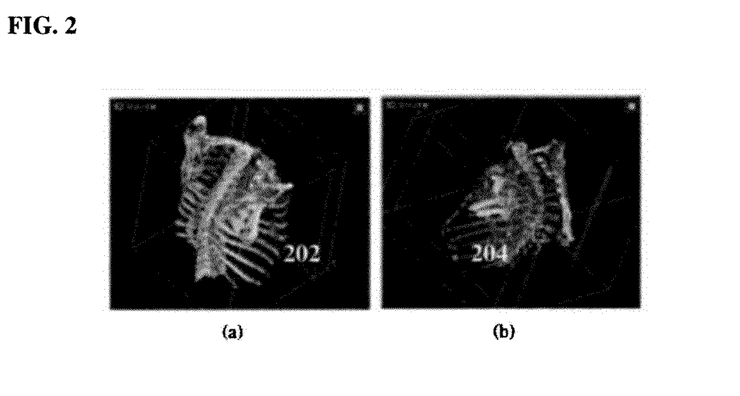
FIG. 2 illustrates examples of different rib pathologies.

Despite the above described clinical importance, automatic detection and labeling of ribs in CT scans remains a challenging task. Most conventional methods model the ribs as elongated tubular structures and employ Hessian or structure tensor eigen-system analysis for ridge voxel detection. However, these algorithms are typically computationally expensive and may not achieve consistent results in all patients. FIG. 1 illustrates examples of different rib cross sections in different patients. As shown in FIG. 1, image (b) shows rib cross sections 104 having more clear dark marrow than the rib cross-sections 102 shown in image (a). In many cases, the rib marrow may be darker than the rib boundary; thus the rib center points may not be consistently detected as ridge voxels. To construct a rib centerline, tracking based methods, such as Kalman filtering, are typically used to trace detected rib center points from one slice to the next. However, some conventional tracking based methods require manual initial seed points, and such point to point tracking methods are highly sensitive to local ambiguities or discontinuities posed by rib pathologies like fractures, which may be of the most interest to radiologists. FIG. 2 illustrates examples of different rib pathologies, which can lead to inaccurate rib centerlines in tracing bade methods. As illustrated in FIG. 2, image (a) shows ribs with missing rib segments 202 and image (b) shows ribs with rib metastases 204. Furthermore, in convention rib tracing algorithms, each rib is individually detected and traced; hence rib labeling requires a separate heuristic method.

BRIEF SUMMARY OF THE INVENTION

The present invention provides a methods and systems for automatic rib centerline extraction and labeling in 3D CT volumes. Embodiments of the present invention utilize learning based rib centerline detection to detect seed points and then match a deformable template of the whole rib cage to the seed points to extract the rib centerlines. By extracting the rib centerlines for the whole rib cage simultaneously instead of individually, embodiments of the present invention can impose prior constraints between neighboring ribs in order to improve robustness during rib tracking, as well as provide rib labeling at the same time as rib tracking.

In one embodiment of the present invention, rib centerline voxels in the 3D volume. Rib centerlines are extracted by matching a template of rib centerlines of a plurality of ribs to the 3D volume based on the detected rib centerline voxels. The template of rib centerlines may be a template of rib centerlines for the whole rib cage. The extracted rib centerlines may be individually refined using an active shape model.

These and other advantages of the invention will be apparent to those of ordinary skill in the art by reference to the following detailed description and the accompanying drawings.

DETAILED DESCRIPTION

The present invention is directed to methods and systems for extracting rib centerlines in 3D medical image volume, such as a 3D computed tomography (CT) volume. Embodiments of the present invention are described herein to give a visual understanding of the rib centerline extraction method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention utilize a deformable template matching method to extract rib centerlines in 3D medical image data. A learning based rib center point detection method using computationally efficient Haar-like features can be used for rib center point detection in a 3D volume. To further speed up runtime detection, a coarse-to-fine pyramid learning structure may be used. A probability response map resulting from the learning based rib center point detection can be used to match a whole rib cage template in order to extract the rib centerlines. By extracting all rib centerlines simultaneously instead of tracing each rib centerline individually, embodiments of the present invention not only can impose prior constraints between neighboring ribs and therefore significantly improve the robustness of the rib centerline tracking, but also provide rib labeling at the same time as the rib tracking. In order to apply the deformation of the rib cage and maintain high computational efficiency, embodiments of the present invention break long ribs into shorter rib segments and perform articulated rigid segment matching by searching for optimal similarity transformation parameters in a manner similar to marginal space learning (MSL). Compared with conventional point to point rib tracing algorithms, embodiments of the present invention are more robust against local ambiguities and discontinuities. Once the centerlines are extracted for all of the rib segments using the template matching, embodiments of the present invention can refine and smooth the rigidly matched rib centerlines with an active contour model.

Figure 3:
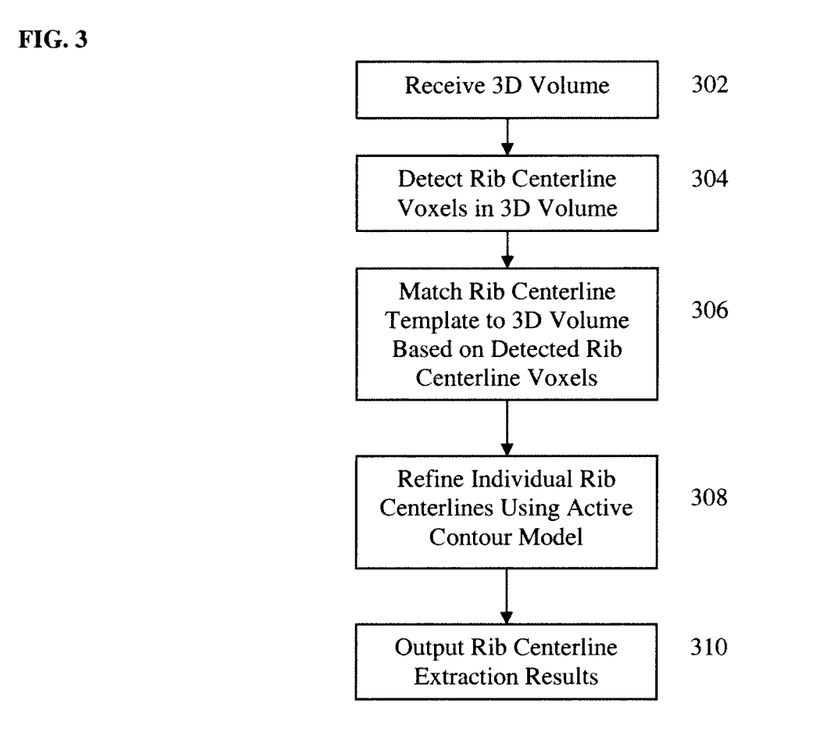
FIG. 3 illustrates a method for extracting rib centerlines from 3D volume according to an embodiment of the present invention.

FIG. 3 illustrates a method for extracting rib centerlines from 3D volume according to an embodiment of the present invention. The method of FIG. 3 transforms a 3D medical image volume, such as a CT volume, and into a set of extracted rib centerlines representing the ribs of a patient. As illustrated in FIG. 3, at step 302, a 3D volume is received. According to an advantageous embodiment, the 3D volume may be a CT volume, but the present invention is not limited thereto. The 3D volume may also be acquired using other medical imaging modalities, such as magnetic resonance (MR), x-ray, ultrasound, etc. The 3D volume may be received directly from an image acquisition device, such as a CT scanner, or the 3D volume may be received by loading a previously stored 3D volume, for example from a storage or memory of a computer system.

At step 304, rib centerline voxels are detected in the 3D volume using a trained rib centerline detector. The ribs cannot be simply modeled as a solid bright tubular structure due to the dark marrow in the interior of the ribs. Accordingly, the maximum response by Hessian eigen-system based filters do not always identify the rib centerlines reliably. In addition, ribs across different volumes exhibit a variety of size, shape, and edge contrast, as shown in FIG. 1. According to an advantageous embodiment of the present invention, a robust learning-based object specific centerline detection method is used to detect the rib centerline voxels, and a probability map resulting from the learning-based detection is used to track and label the rib centerlines.

A rib centerline detector is trained using annotated training data. In an advantageous implementation, 3D Haar-like features are used to train the rib centerline detector. A 3D Haar-like feature considers adjacent box regions at a specific location in a detection window and calculates the difference between the sum of pixel intensities within the regions. The features can be rapidly computed using summing area tables. In order to train the rib centerline detector, the 3D Haar-like features are extracted at positive and negative training samples within the training data, and the rib centerline detector is trained based on the extracted features. In a possible embodiment, the rib centerline detected can be trained as a probabilistic boosting tree classifier (PBT) having multiple nodes of AdaBoost classifiers. However, the present invention is not limited to PBT classifiers and other machine learning algorithms may also be used to the train the rib centerline detector.

Figure 4:
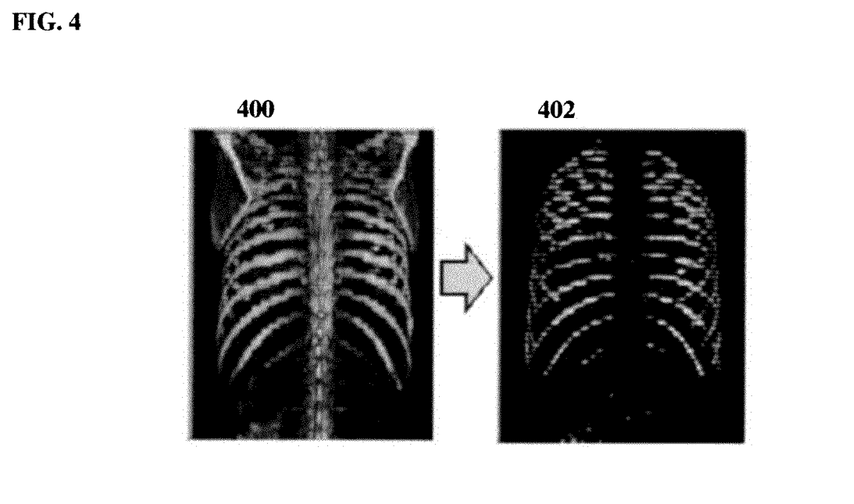
FIG. 4 illustrates exemplary rib centerline voxel detection results.

In an advantageous embodiment, instead of using only a single PBT (or other type of classifier), a coarse-to-fine pyramid of PBT classifiers may be trained and used for rib centerline voxel detection, which not only significantly speeds up detection by image downsampling thus reducing the number of samples in earlier stages of classification, but also exploits longer range spatial context in a lower resolution. Given the received 3D volume, the trained classifiers are applied to the 3D volume and determine for each voxel of the 3D volume, a probability that the voxel is a rib centerline voxel. Accordingly, the trained rib centerline detector generates a probability response map P(x) that indicates the likelihood of each voxel being a rib centerline. FIG. 4 illustrates exemplary rib centerline voxel detection results. As illustrated in FIG. 4, image 400 shows a received CT volume and image 402 illustrates the probability response map generated using a trained rib centerline detector.

Returning to FIG. 3, at step 306, a rib centerline template is matched to the 3D volume based on the detected rib centerline voxels. The probability map generated by the rib centerline detector may not always be reliable because of distractions from neighboring similar bone structures, such as the clavicle and scapula, or local ambiguities or discontinuities caused by rib lesions. Accordingly, a robust rib tracking and labeling method is used to extract the rib centerlines based on the probability map. Conventional point to point tracing methods, such as Kalman filtering or region growing processes, are highly sensitive to local rib anomalies and thus subject to error propagation.

Embodiments of the present invention utilize a template based matching method for rib centerline extraction. The rib centerline template is constructed offline by manually annotating and labeling 12 pairs of rib centerlines from a normal rib cage, and each rib $R_i$ ($1 \leq i \leq C$, $C=24$) of the rib centerline template is represented by a set of evenly sampled centerline voxels $x_n$ ($1 \leq v \leq N_i$), where $N_i$ is the length of the rib $R_i$. The template is stored, for example in a memory or storage of a computer system, and then matched to the received 3D volume based on the probability map generated using the trained rib centerline detector. In order to match the template to the 3D volume, a best transformation T that maximizes the sum of the response of the transformed template on the generated probability map:

$$\sum_{i=1}^{C} \sum_{n 1=}^{N_i} P(T(x_n)). \quad (1)$$

The use of the template of a whole rib cage distinguishes this method from conventional rib detection methods in that all of the ribs are tracked or matched simultaneously. The whole rib cage template allows shape constraints to be imposed on neighboring ribs during tracking or matching to overcome distractions from adjacent bone structures, such as the clavicle or adjacent ribs. Furthermore, the template matching using the template of the whole rib cage automatically labels the ribs in the 3D volume, since the ribs labels of the ribs in the stored rib centerline template are known.

Figure 5:
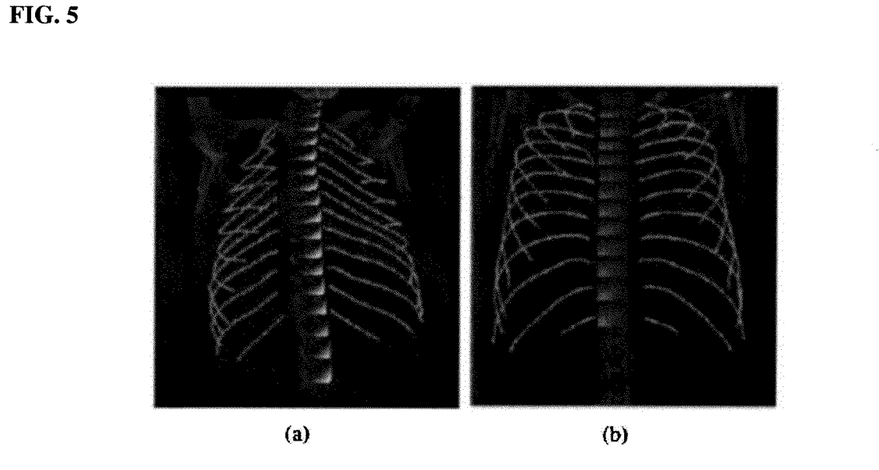
FIG. 5 illustrates examples of rib centerlines for different rib cage shapes.

FIG. 5 illustrates examples of rib centerlines for different rib cage shapes. As shown in images (a) and (b) of FIG. 5 there may be considerable deformation of the rib cage and considerable variation in spacing between adjacent ribs from one patient to another. Due to the considerable deformation of the rib cage and variations in spacing between adjacent ribs in different patients, a simple rigid registration may not yield accurate results. Conventional non-rigid transformation or registration approaches may be computationally expensive and vulnerable to local minima, leading to inaccurate results. In an advantageous embodiment of the present invention, an articulated matching method is used to match the rib centerline template to the 3D volume. In particular, each rib $R_i$ is broken into several shorter segments $R_{i,k}$ ($1 \le k \le K$). Each rib segment centerline thus has a lesser degree of curvature and therefore can be approximately matched via a rigid transformation by searching for the optimal similarity transform parameters $T_{i,k}=(t_{i,k},o_{i,k},s_{i,k})$, where $(t_{i,k},o_{i,k},s_{i,k})$ denote the translation, orientation, and scale parameters, respectively, as expressed in Equation (2):

$$\hat{T}_{i,k} = \underset{T_{i,k} \in T}{\operatorname{argmax}} \sum_{n=1}^{N_{i,k}} P(T_{i,k}(x_n)), \qquad (2)$$

where T is the set of similarity transformations T. In an advantageous implementation, instead of exhaustively searching the nine dimensional parameter space of $(t_x, t_y, t_z, o_x, o_y, o_z, s_x, s_y, s_z)$, only low-dimensional marginal spaces are searched in a strategy similar to marginal space learning (MSL). In particular, the transformation estimation for each rib segment is split into three steps: position estimation, position-orientation estimation, and position-orientation-scale estimation. First the positional marginal space is exhaustively searched and a number of best position candidates are preserved. Next, the orientation marginal space is exhaustively searched for each position candidate (i.e., by generating a number of position-orientation hypotheses for each position candidate), and a number of best position-orientation candidates are preserved. Next, the scale marginal space is searched for each position-orientation candidate (i.e., by generating a number of position-orientation-scale hypotheses for each position-orientation candidate), resulting in one or more best candidates for the full transformation (position-orientation-scale) for the rib segment. A separate trained classifier (e.g., PBT classifier) can be trained using annotated training data for each stage (position, position-orientation, and position-orientation-scale).

In equation (2), each rib segment is searched individually and therefore may be matched to a wrong rib due to similarity between adjacent ribs. To avoid this problem, embodiments of the present invention impose pairwise smoothness constraints on the transform parameters of neighboring rib segments using a Markov random field (MRF) model:

$$\underset{(T_{i,k},T_{j,k}) \in T}{\operatorname{argmax}} \sum_{i=1}^{C} \sum_{n=1}^{N_{i,k}} P(T_{i,k}(x_n)) - \lambda \sum_{i,j \in N_\delta} L(T_{i,k}, T_{j,k}), \qquad (3)$$

where $\lambda$ is the regularization parameter, $N_\delta$ denotes a set of neighboring rib pairs (i,j) and L is the similarity function of two transform parameters defined as:

$$L(\mathcal{T}_{i,k}, \mathcal{T}_{jk}) = \qquad (4)$$
$$\sum_{n=1}^{N_{i,k}} \|\mathcal{T}_{i,k}(x_n) - \mathcal{T}_{j,k}(x_n)\|^2 / N_{i,k} + \sum_{n=1}^{N_{j,k}} \|\mathcal{T}_{i,k}(x_n) - \mathcal{T}_{j,k}(x_n)\|^2 / N_{j,k},$$

where L measures the average Euclidean distance of two neighboring rib segments $R_{i,k}$ and $R_{t,k}$ transformed by different parameters $T_{i,k}$ and $T_{t,k}$, respectively.

Figure 6:
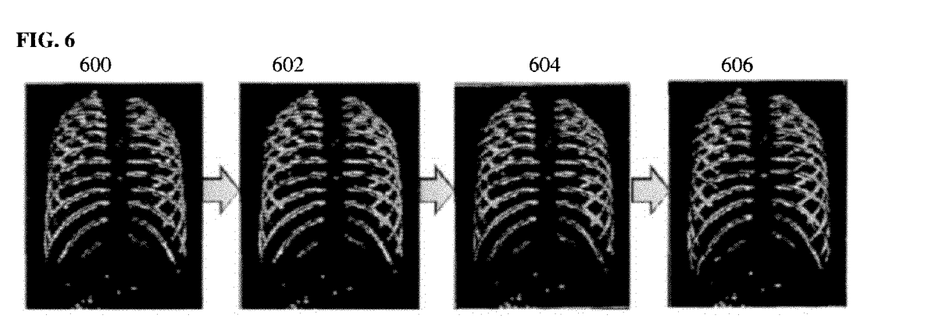
FIG. 6 illustrates exemplary results of an articulated rib segment matching method.

In order to maximize Equation (3), and find the best set of transformations for all of the rib segments, the transformation parameters $T_{i,k}$ are searched separately and a number of top candidates for the transformation parameters $T_{i,k}$ are kept for each rib segment $R_{i,k}$. In particular, the transformation parameters can be detected for each rib segment by searching the probability response map using a set of classifiers (position, position-orientation, and position-orientation-scale) trained for that segment. Then the optimal combination of all rib segment transformations $\hat{T}_{i,k}$ ($1 \le i \le C$) to maximize Equation (3) can be efficiently determined using dynamic programming. FIG. 6 illustrates exemplary results of the articulated rib segment matching method. As illustrated in FIG. 6, images 600, 602, 604, and 606 show articulated rib segment matching of a template of rib centerlines, where each rib is split into four segments (K=4).

Figure 7:
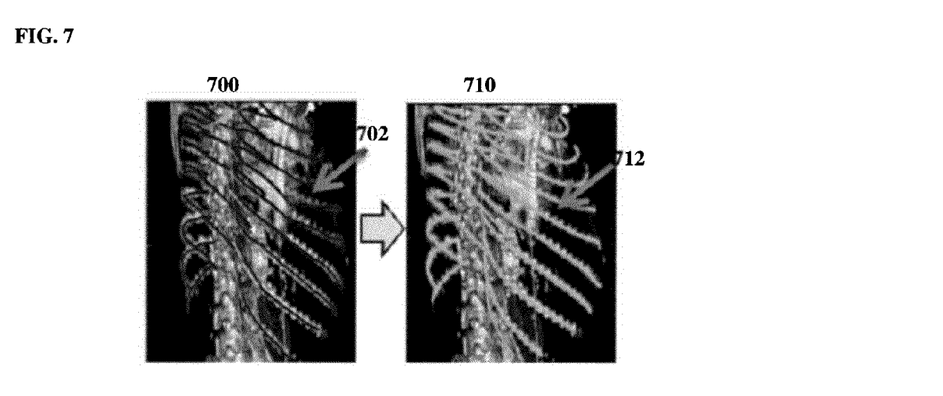
FIG. 7 illustrates exemplary rib centerline refinement using an active contour.

Returning to FIG. 3, at step 308, individual rib centerlines are refined using an active contour model. Because each rib segment is transformed rigidly, the articulated rib centerline is piecewise smooth and subject to small deviation due to slight deformation of each rib segment, as well as limited resolution of discrete transformation parameter search space. Accordingly, embodiments of the present invention employ an active contour model or snakes to further refine the template matching results. The active contour model is applied individually to each extracted rib centerline to refine each rib centerline based on the probability response map by minimizing and energy function:

$$E = \sum_{i=1}^{C} \sum_{n=1}^{N_i} \frac{\alpha}{2} |x'_n|^2 + \frac{\beta}{2} |x''_n|^2 - P(x_n), \qquad (5)$$

where $\alpha$ and $\beta$ control the elastic force and rigid force, respectively, and $x_j$ denotes the rib centerline points. On possible problem in applying such active contour models is associated with the initialization. The starting contour must, in general, be close to the true boundary or the contour will likely converge to the wring result. However, this is not a problem in embodiments of the present invention because the articulated template matching provides a good initialization for the rib centerlines. The minimization of the energy function of Equation (5) gives rise to solving corresponding Euler equations, and well known iterative numerical methods may be used to solve the Euler equations. FIG. 7 illustrates exemplary rib centerline refinement using an active contour. As illustrated in FIG. 7, image 700 shows rib centerlines extracted using the articulated template matching and image 710 shows refined rib centerlines resulting from applying the active contour model. A disjointed rib centerline 702 can be seen in image 700 and the corresponding refined rib centerline 712 is shown in image 710.

Returning to FIG. 3, the rib centerline extraction results are output. The extracted rib centerlines can be output by displaying the extracted rib centerlines, for example on a display of a computer system, The extracted rib centerlines can also be output by storing the extracted rib centerlines, for example in a memory or storage or a computer system.

Figure 8:
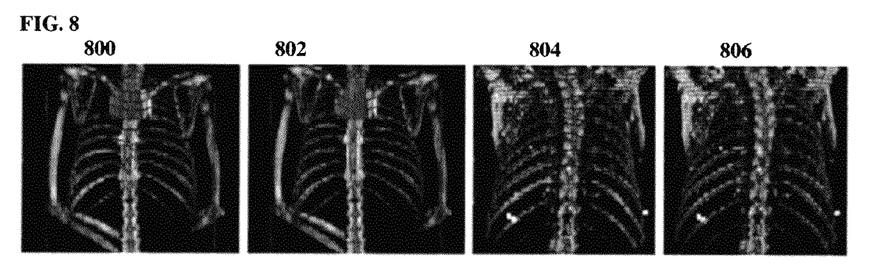
FIG. 8 illustrates exemplary rib centerline extraction results.

FIG. 8 illustrates exemplary rib centerline extraction results. As illustrated in FIG. 8, image 800 shows rib centerlines extracted in a first CT volume using a conventional random walker segmentation based tracing method and image 802 shows rib centerlines extracted in the first CT volume using the method of FIG. 3. Image 804 shows rib centerlines extracted in a second CT volume using the conventional random walker segmentation based tracing method and image 806 shows rib centerlines extracted in the second CT volume using the method of FIG. 3. As can be seen in FIG.

8, the method of FIG. 3, according to embodiment of the present invention, is significantly more robust than the conventional tracing based method.

Figure 9:
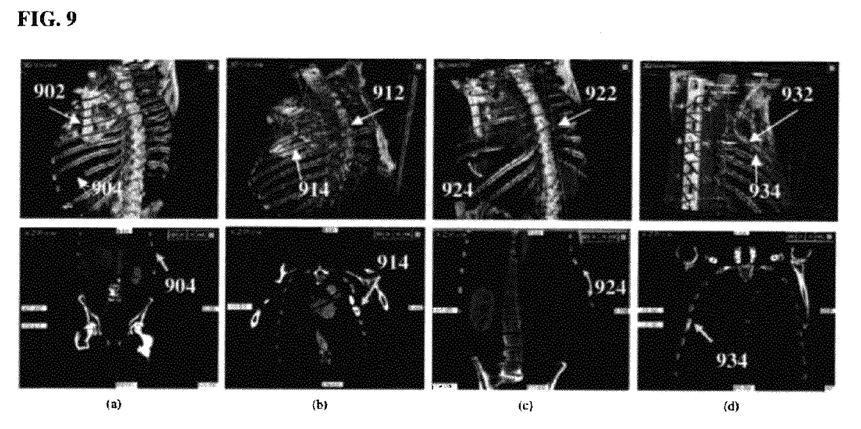
FIG. 9 illustrates exemplary rib centerline extraction results for challenging cases using the method of FIG. 3.

FIG. 9 illustrates exemplary rib centerline extraction results for challenging cases using the method of FIG. 3. As illustrated in FIG. 9, image (a) shows rib centerlines 902 extracted for a set of ribs having a missing rib segment 904. Image (b) shows rib centerlines 912 extracted for ribs having rib metastases 914. Image (c) shows rib centerlines 922 extracted for ribs having unusually large spacing 924 between neighboring ribs. Image (d) shows rib centerlines 932 extracted for a set of ribs including connected ribs 934.

Figure 10:
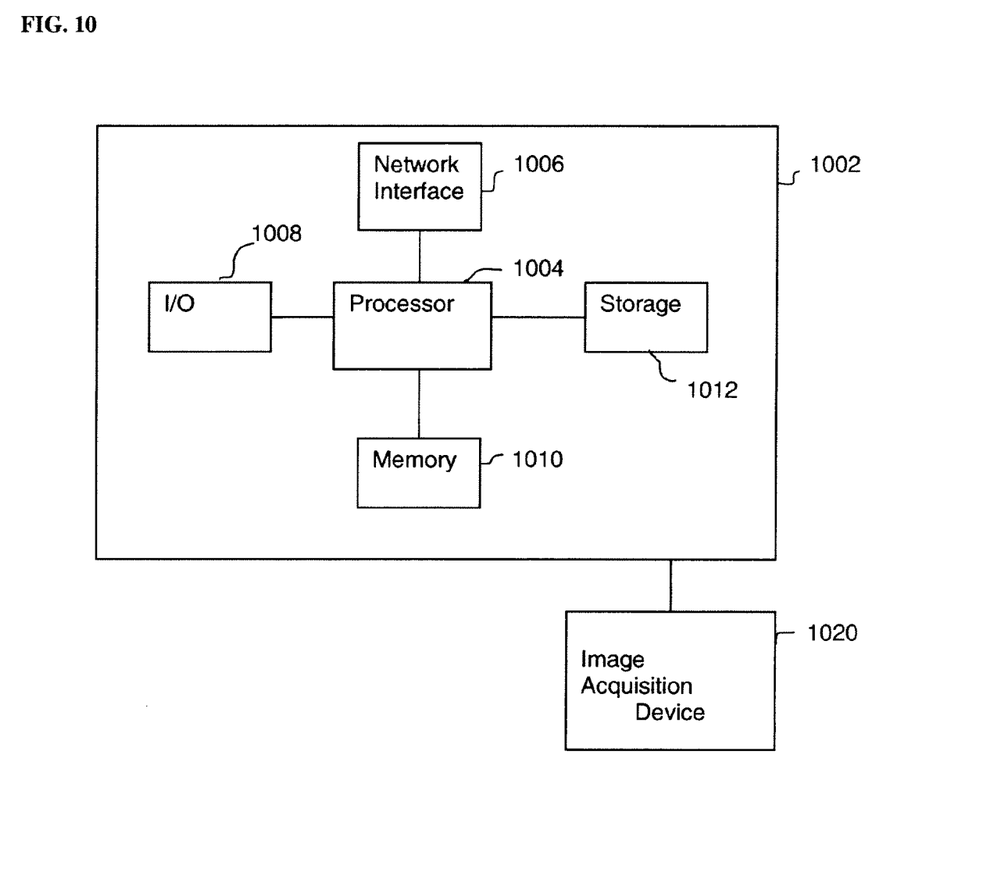
FIG. 10 is a high level block diagram of a computer capable of implementing the present invention.

The above-described methods for rib centerline extraction may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.) and loaded into memory 1010 when execution of the computer program instructions is desired. Thus, the steps of the method of FIG. 3 may be defined by the computer program instructions stored in the memory 1010 and/or storage 1012 and controlled by the processor 1004 executing the computer program instructions. An image acquisition device 1020, such as a CT scanner, can be connected to the computer 1002 to input images to the computer 1002. It is possible to implement the image acquisition device 1020 and the computer 1002 as one device. It is also possible that the image acquisition device 1020 and the computer 1002 communicate wirelessly through a network. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for extracting rib centerlines in a 3D volume, comprising:
    detecting rib centerline voxels in the 3D volume; and
    extracting rib centerlines by matching a template of rib centerlines of a plurality of ribs to the 3D volume based on the detected rib centerline voxels.

2. The method of claim 1, wherein the template of rib centerlines of a plurality of ribs comprises a template of rib centerlines for an entire rib cage.

3. The method of claim 1, further comprising:
    individually refining each of the extracted rib centerlines using an active contour model.

4. The method of claim 1, wherein the step of detecting rib centerline voxels in the 3D volume comprises:
    detecting the rib centerline voxels in the 3D volume using a trained rib centerline voxel detector.

5. The method of claim 4, wherein the trained rib centerline detector is a probabilistic boosting tree (PBT) classifier trained based on annotated training data.

6. The method of claim 4, wherein the trained rib centerline detector comprises a coarse-to-fine pyramid of trained classifiers.

7. The method of claim 1, wherein the step of detecting rib centerline voxels in the 3D volume comprises generating a probability response map by determining probability for each of a plurality of voxels in the 3D volume, that the voxel is a rib centerline voxel, and the step of extracting rib centerlines by matching a template of rib centerlines of a plurality of ribs to the 3D volume based on the detected rib centerline voxels comprises:
    matching the template of rib centerlines to the probability response map.

8. The method of claim 7, wherein the template of rib centerlines comprises a plurality of rib segments for each rib centerline, and the step of matching the template of rib centerlines to the probability response map comprises:
    determining, for each of the plurality of rib segments for each rib centerline, a number of transformation candidates to match that rib segment to the probability response map; and
    determining a combination of the transformation candidates for the plurality of rib segments for each rib centerline to maximize a total probability of the rib centerlines based on the probability response map, subject to a pairwise smoothness constraint on transformations of neighboring rib segments.

9. The method of claim 8, wherein the step of determining, for each of the plurality of rib segments for each rib centerline, a number of transformation candidates to match that rib segment to the probability response map comprises, for each rib segment:
    detecting position candidates in the probability response map using a first trained classifier;
    detecting position-orientation candidates in the probability response map based on the detected position candidates using a second trained classifier; and
    detecting the transformation candidates in the probability response based on the detected position-orientation candidates using a third trained classifier.

10. The method of claim 8, wherein the step of determining a combination of the transformation candidates for the plurality of rib segments for each rib centerline to maximize a total probability of the rib centerlines based on the probability response map, subject to a pairwise smoothness constraint on transformations of neighboring rib segments comprises:
    determining the combination of transformation candidates for the plurality of rib segments of each rib centerline to maximize a total probability of the rib centerlines based on the probability response map, subject to a pairwise smoothness constraint on transformations of neighboring rib segments using dynamic programming.

11. An apparatus for extracting rib centerlines in a 3D volume, comprising:
    means for detecting rib centerline voxels in the 3D volume; and means for extracting rib centerlines by matching a template of rib centerlines of a plurality of ribs to the 3D volume based on the detected rib centerline voxels.

12. The apparatus of claim 11, wherein the template of rib centerlines of a plurality of ribs comprises a template of rib centerlines for an entire rib cage.

13. The apparatus of claim 11, further comprising:
means for individually refining each of the extracted rib centerlines using an active contour model.

14. The apparatus of claim 11, wherein the means for detecting rib centerline voxels in the 3D volume comprises:
means for detecting the rib centerline voxels in the 3D volume using a trained rib centerline voxel detector.

15. The apparatus of claim 11, wherein the means for detecting rib centerline voxels in the 3D volume comprises means for generating a probability response of a probability for each of a plurality of voxels in the 3D volume, that the voxel is a rib centerline voxel, and the means for extracting rib centerlines by matching a template of rib centerlines of a plurality of ribs to the 3D volume based on the detected rib centerline voxels comprises:
means for matching the template of rib centerlines to the probability response map.

16. The apparatus of claim 15, wherein the template of rib centerlines comprises a plurality of rib segments for each rib centerline, and the means for matching the template of rib centerlines to the probability response map comprises:
means for determining, for each of the plurality of rib segments for each rib centerline, a number of transformation candidates to match that rib segment to the probability response map; and
means for determining a combination of the transformation candidates for the plurality of rib segments for each rib centerline to maximize a total probability of the rib centerlines based on the probability response map, subject to a pairwise smoothness constraint on transformations of neighboring rib segments.

17. A non-transitory computer readable medium storing computer program instructions for extracting rib centerlines in a 3D volume, the computer program instructions when executed by a processor cause the processor to perform operations comprising:
detecting rib centerline voxels in the 3D volume; and
extracting rib centerlines by matching a template of rib centerlines of a plurality of ribs to the 3D volume based on the detected rib centerline voxels.

18. The non-transitory computer readable medium of claim 17, wherein the template of rib centerlines of a plurality of ribs comprises a template of rib centerlines for an entire rib cage.

19. The non-transitory computer readable medium of claim 17, wherein the operations further comprise:
individually refining each of the extracted rib centerlines using an active contour model.

20. The non-transitory computer readable medium of claim 17, wherein the operation of detecting rib centerline voxels in the 3D volume comprises:
detecting the rib centerline voxels in the 3D volume using a trained rib centerline voxel detector.

21. The non-transitory computer readable medium of claim 20, wherein the trained rib centerline detector comprises a coarse-to-fine pyramid of trained classifiers.

22. The non-transitory computer readable medium of claim 17, wherein the operation of detecting rib centerline voxels in the 3D volume comprises generating a probability response map by determining probability for each of a plurality of voxels in the 3D volume, that the voxel is a rib centerline voxel, and the operation of extracting rib centerlines by matching a template of rib centerlines of a plurality of ribs to the 3D volume based on the detected rib centerline voxels comprises:
matching the template of rib centerlines to the probability response map.

23. The non-transitory computer readable medium of claim 22, wherein the template of rib centerlines comprises a plurality of rib segments for each rib centerline, and the operation of matching the template of rib centerlines to the probability response map comprises:
determining, for each of the plurality of rib segments for each rib centerline, a number of transformation candidates to match that rib segment to the probability response map; and
determining a combination of the transformation candidates for the plurality of rib segments for each rib centerline to maximize a total probability of the rib centerlines based on the probability response map, subject to a pairwise smoothness constraint on transformations of neighboring rib segments.

24. The non-transitory computer readable medium of claim 23, wherein the operation of determining, for each of the plurality of rib segments for each rib centerline, a number of transformation candidates to match that rib segment to the probability response map comprises, for each rib segment:
detecting position candidates in the probability response map using a first trained classifier;
detecting position-orientation candidates in the probability response map based on the detected position candidates using a second trained classifier; and
detecting the transformation candidates in the probability response based on the detected position-orientation candidates using a third trained classifier.

25. The non-transitory computer readable medium of claim 23, wherein the operation of determining a combination of the transformation candidates for the plurality of rib segments for each rib centerline to maximize a total probability of the rib centerlines based on the probability response map, subject to a pairwise smoothness constraint on transformations of neighboring rib segments comprises:
determining the combination of transformation candidates for the plurality of rib segments of each rib centerline to maximize a total probability of the rib centerlines based on the probability response map, subject to a pairwise smoothness constraint on transformations of neighboring rib segments using dynamic programming.

* * * * *